United States Patent Office 2,694,407
Patented Nov. 16, 1954

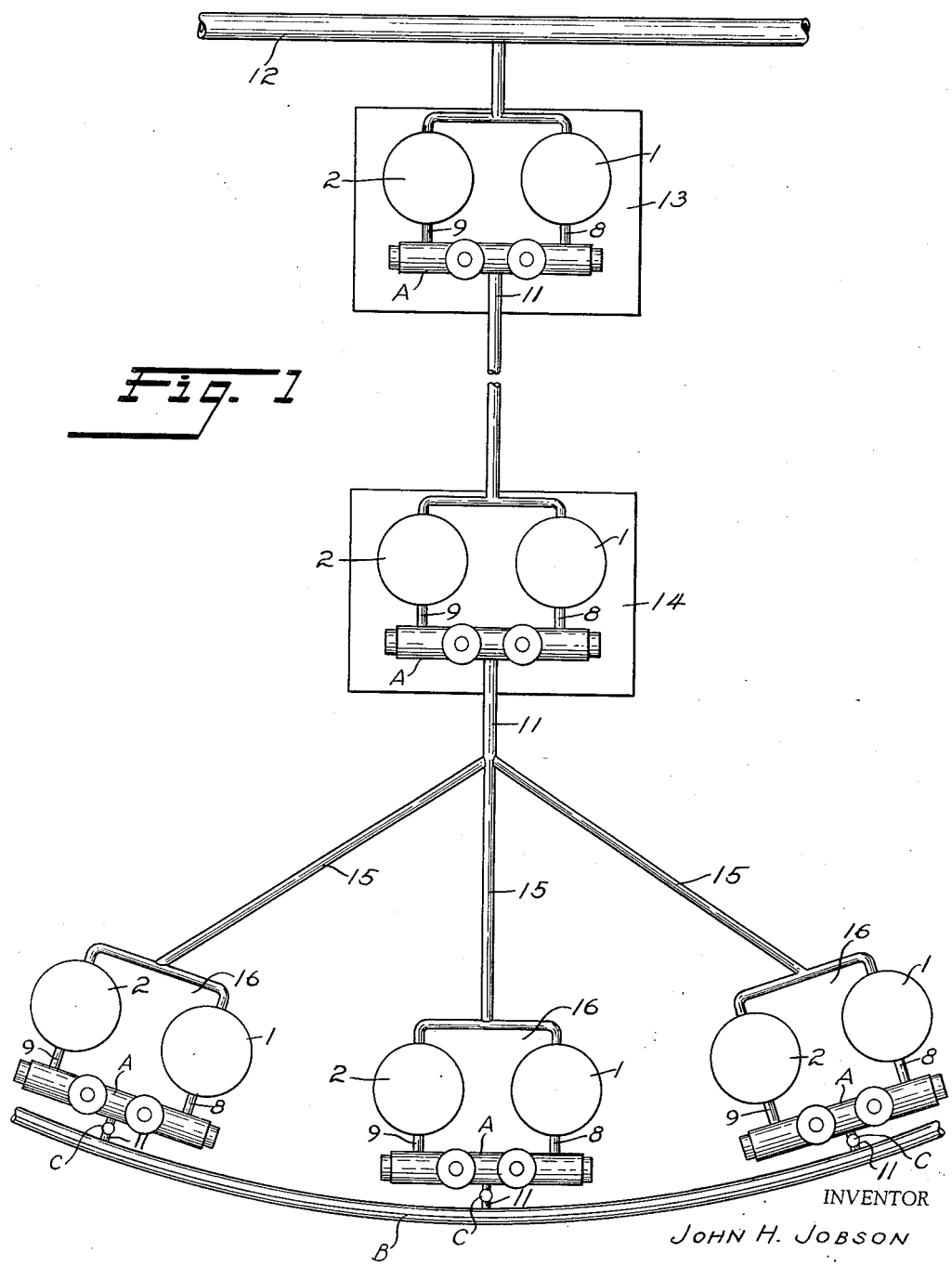

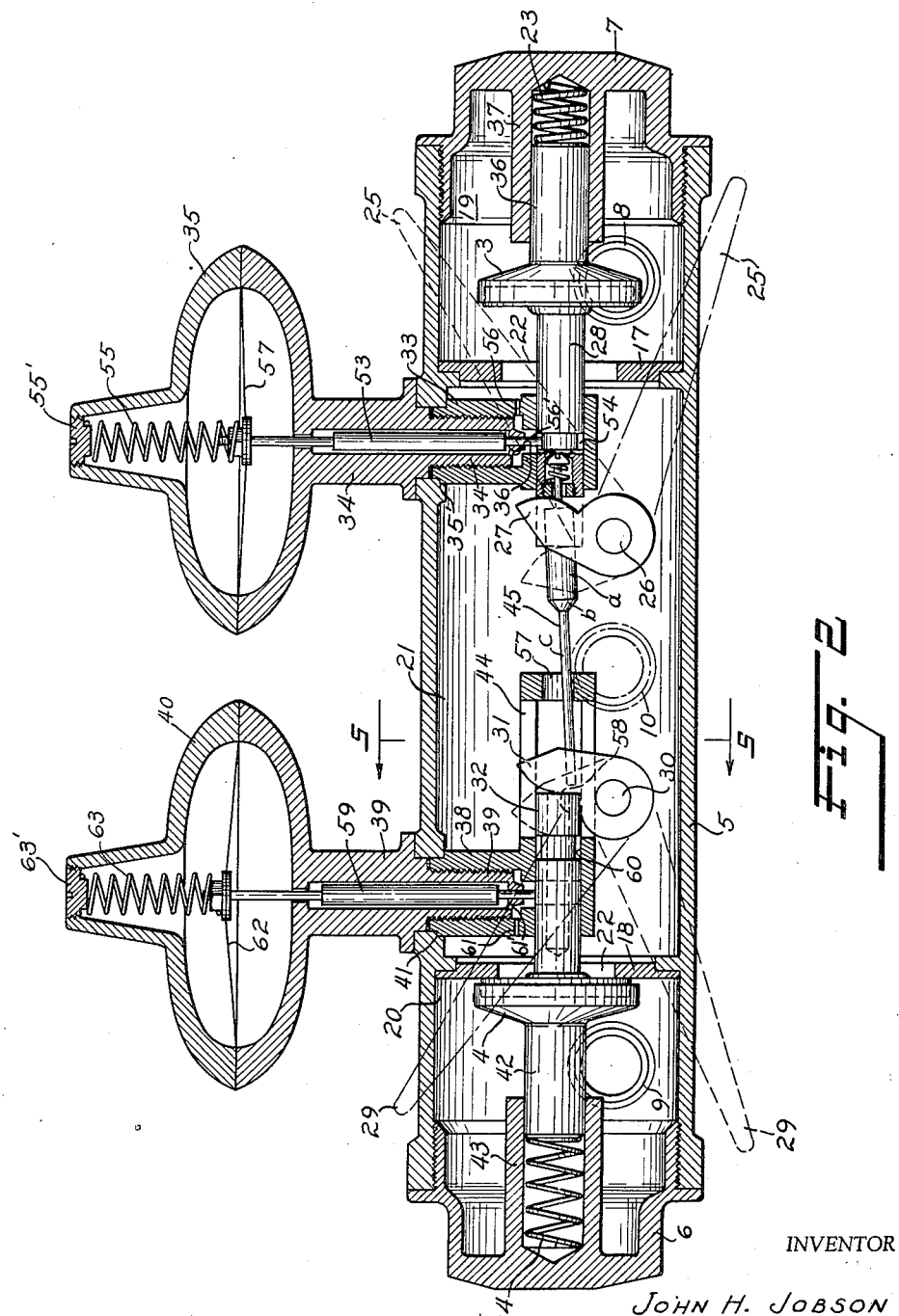

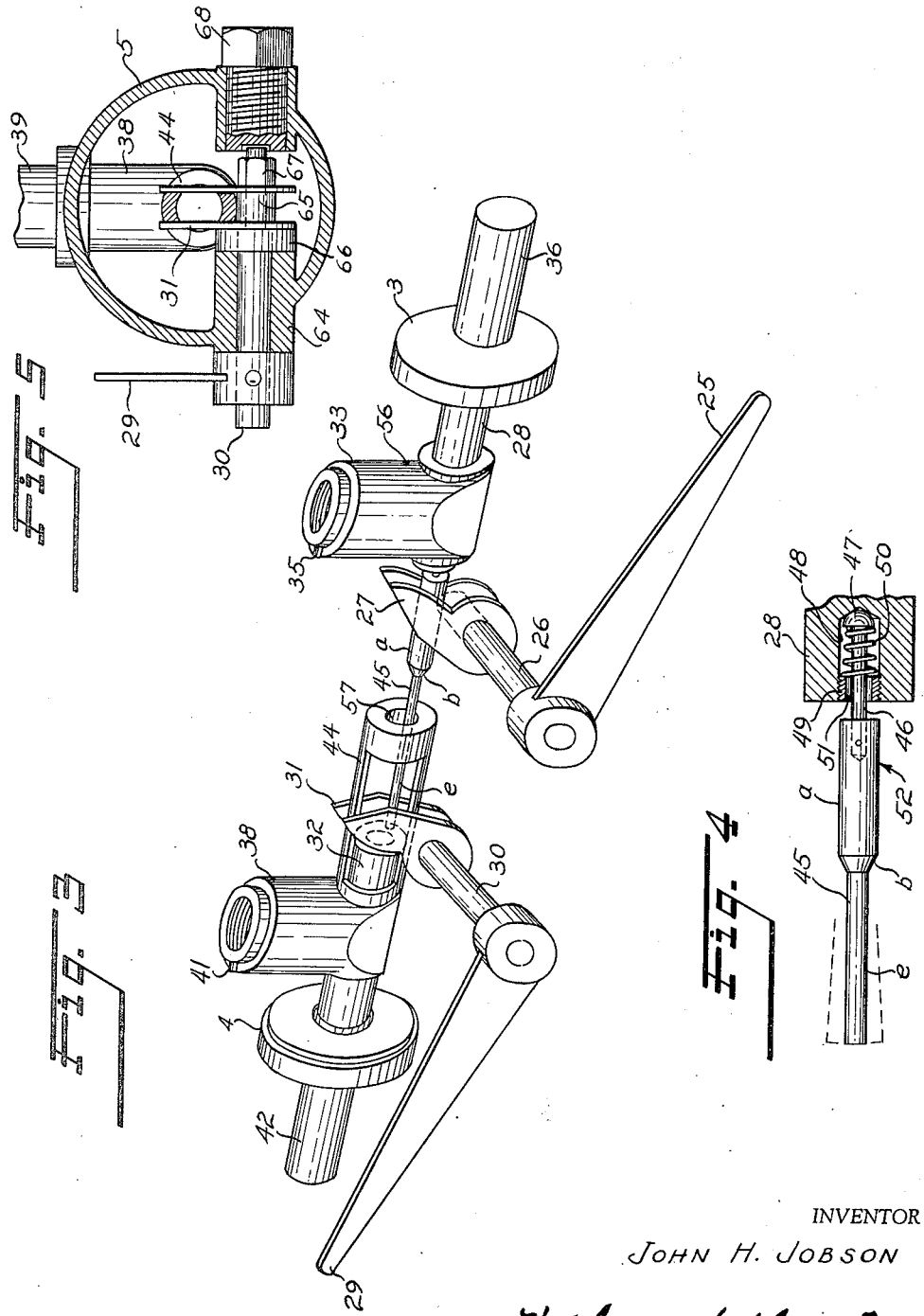

2,694,407

SAFETY DEVICE FOR FLUID PRESSURE PIPE LINES

John H. Jobson, Gaffney, S. C., assignor of one-half to Elizabeth Klein Jobson, Gaffney, S. C.

Application June 4, 1953, Serial No. 359,587

22 Claims. (Cl. 137—112)

This invention relates primarily to safety systems for pressure pipe lines conveying gases and the like and wherein dual pressure regulating valves are employed particularly in pressure lines to effect multiple stage reduction when there is a very wide differential between high pressure and the final low pressure used for commercial and domestic purposes.

It is now common practice to convey natural gas through transcontinental pipe lines and where the pressure within such pipe lines is maintained at approximately 700 lbs. per square inch throughout its entire length by booster stations located along the route. When a tap line is taken off this transcontinental pipe line, such for instance as leading to a city, immediately adjoining the tap line, the gas undergoes a pressure reduction preferably through the medium of a dual arrangement of pressure regulating valves, including a primary reducing regulator and an emergency reducing regulator, said last mentioned regulator being held in reserve in the event the primary reducing regulator is at any time unable to function properly. This pressure reduction is preferably accomplished in multiple stages and with the dual system of pressure regulating valves installed at each stage of pressure reduction, until finally the gas is conveyed to what might be called a town border station where the gas is further reduced to approximately 40 lbs. per square inch. From the town borner station the gas is conveyed through branch pipe lines or laterals as they are sometimes called, to underground feeder stations located in several different sections of a city, and this for the purpose of maintaining an even distribution of gas through the city mains.

Furthermore, it must be borne in mind that the dual system of pressure regulating valves is common practice not only at all of the pressure reducing stages and stations, but also at the several underground feeder stations as maintained for serving the city mains and with the purpose in view at each of these installations of having only one reducing regulator functioning at any particular time and with the other reducing regulator held in reserve in case of an emergency.

The main object of the present invention is to provide a safety device associated with each of the dual pressure reducing regulator set-ups to prevent an undue rise of pressure in the lower pressure lines, and wherein said safety device also serves as a means for readily detecting this rise of pressure caused by any defective pressure reducing regulator in the system, and furthermore, rendering it possible through said safety device to readily discover the faulty pressure regulator among the several regulators as installed at the various feeder stations serving the city mains, and this in a relatively short space of time when considering common practice in pressure reducing systems of the character indicated.

More specifically, it is an object of the invention to provide a safety device of this character properly installed in the pressure pipe line and incorporating a dual valve arrangement consisting of a primary cut-off valve (normally open under initial operation of the device) and a secondary cut-off valve (normally closed and during the time the primary reducing regulator is properly functioning in the system), and wherein as for instance when an undue rise in pressure occurs due to a defective primary reducing regulator, the normally opened primary cut-off valve of the safety device will be moved to closed position to cut out the primary reducing regulator, and wherein during such movement of the primary cut-off valve to closed position, the secondary cut-off valve, normally closed under such conditions, will be automatically cocked to open position to thereby cut in the emergency or reserve reducing regulating to immediately permit continued flow of the pressure gases under normal and proper working conditions.

A further object of this invention is the provision of setting and indicator arms for the primary and secondary cut-off valves of the safety device, whereby either of said valves may be cocked to open position by manual operation, and where also said arms serve as indicators for the purpose of determining at a glance if the valves are in open or closed positions.

Other objects and various features of novelty and invention will be hereinafter pointed out or will become apparent to those skilled in the art.

The invention is illustrated in the accompanying drawings, in which

Fig. 1 is a diagrammatic view showing a multiple stage pressure reducing system employing dual pressure reducing regulators, and particularly the method of installing in association with each dual regulator set-up, the safety device of the present invention.

Fig. 2 is a longitudinal sectional view through the safety device showing its dual valve arrangement and their operating parts, and also illustrating the dual arrangement of diaphragm pressure devices as associated therewith:

Fig. 3 is a perspective view of the safety device dual valve arrangement, showing particularly the valve cocking cams and associated parts including the valve setting and indicator arms.

Fig. 4 is a detail view, partly in section, showing particularly the pivotal connection of the secondary valve cocking pin, and Fig. 5 is a transverse section of the safety device on the line 5—5 of Fig. 2, and showing one embodiment of a mounting for the cam shaft and its valve cocking cam.

In Fig. 1 of the drawing is illustrated diagrammatically a pressure reducing system showing the multiple stage reduction arrangement as usually installed between the transcontinental pipe line and the city mains, including the dual arrangement of pressure regulating valves as commonly used at each pressure reducing station, and furthermore, including the safety device as installed at each station, which safety device is the subject-matter of the present invention.

The dual arrangement of pressure regulating valves constitutes a primary reducing valve 1 and an emergency reducing valve 2 at each station as indicated in said Fig. 1, and in the normal operation of the pressure system the primary reducing valve 1 is in action for the purposes intended, said emergency reducing valve 2 being held in reserve in the event of failure of the primary reducing valve 1. This is common practice in installations of pressure reducing systems of the character as herein disclosed.

In such commonly installed systems, and in order to enable a close check being kept on the pressure within the city mains, there is usually installed at one or several locations, a gauge or pressure recording instrument, and these instruments are noted by an attendant day and night for any variation in pressure in the system. If any such pressure variation should occur, then the service crew is immediately called out to make inspection at the several underground feeder stations until the defective pressure reducing regulator is located, consuming as a general rule approximately twenty to forty minutes at each station.

In this connection, the service crew, in performing their duties at each underground feeder station when necessary to visit said stations in case of trouble in the pressure line, are required under the present practice to follow the time consuming formula of first, manually cutting out the primary pressure regulator and at the same time cut in the secondary pressure regulator; then note the gauge or recording instrument for a drop in pressure; then if no pressure drop was noted they would cut out the emergency regulator and restore the cut-out primary regulator to its normal working condition in the system; and immediately thereafter the service crew would then go to the next underground feeder station where the same performance of inspection is carried out again and again at each feeder station until the defective pressure regulator is finally located. This kind of inspection is time consuming and naturally, and in the event that it was necessary to make such inspection at quite a few underground feeder stations, considerable damage to the system could result due to the pressures in the city mains rising to the danger point before locating the particular trouble in question, and especially if such trouble should occur at night or any time when the consumption of gas is relatively light.

The principal feature of the present invention is to prevent to a material degree the building up of abnormally high pressure in pressure lines, and in its generic aspect, includes what is, in effect, a safety device or system installed in the pressure line and preferably located as for instance between the dual pressure reducing regulators and the city mains, one of these safety devices being connected in the pressure line for the purposes intended at each underground feeder station, and with the flow of gas or other fluid passing through each safety device regardless of which one of the two pressure reducing regulators is in action and properly functioning.

These safety devices are generally designated as A in the drawings, and their method of installing may be viewed and readily understood by reference particularly to Fig. 1 of the drawings. Each safety device as so positioned in the pressure line, embodies a dual valve arrangement consisting of a primary cut-off valve 3 and a secondary cut-off valve 4 (see particularly Fig. 2), said primary cut-off valve 3 under certain conditions controlling the flow of pressure gases passing through and from its associated primary reducing valve or regulator 1, and the secondary cut-off valve 4 serving to control the pressure gases passing through and from the emergency reducing valve or regulator 2, it being noted, however, that the successful operation of the safety device requires that while the primary cut-off valve 3 is in open position to permit flow of pressure gas through the system and directly from the primary reducing valve or regulator, the secondary cut-off valve 4 remains in closed position cutting out flow of gas through and from the emergency reducing valve or regulator 2 and to thereby hold said emergency regulator 2 in reserve in case of failure of the primary regulator 1. And it is also well to note that when the secondary cut-off valve 4 is moved to open position to cut in the emergency regulator 2, of course the primary cut-off valve has been moved to its closed position cutting out the primary reducing regulator 1 which is then defective.

Furthermore, and with reference to this dual valve arrangement of the safety device, provision is made whereby the movement of the primary cut-off valve 3 to its closed position, as above set forth, is instrumental in moving at that moment the secondary cut-off valve 4 to its open position, and therefore by such operation and in an instant serving to cut out the primary reducing regulator (due to failure) and cut in or place in operation the emergency reducing regulator.

The safety device comprises in detail a housing 5 within which the dual cut-off valve arrangement is mounted for operation, and this housing is closed at its ends preferably by screw caps 6 and 7, which caps may be removed for proper insertion and installation of the valves and other parts constituting the safety device. This valve housing 5 is in fluid pressure communication with both the primary and emergency reducing regulators with which it is associated, the fluid pressure from the primary regulator to the housing passing through a pipe connection 8 extending from said regulator and entering at a side of said housing near one end thereof, a similar pipe connection 9 be used for placing the associated emergency reducing regulator in fluid pressure communication with the housing near the other end of said housing. In other words, there are two pressure fluid inlets to the housing, one extending from the primary regulator and the other extending from the emergency regulator, and in either case the fluid pressure enters the housing near an end thereof. Intermediate these two inlet openings is an outlet 10 from the housing, and this outlet is preferably located at a side of the housing opposite to that of the inlet openings 8 and 9, and it is through such outlet 10 the pressure gas or fluid is piped to the various stations or city mains, as for instance through suitable length pipe lines as indicated at 11 in Fig. 1.

It may be advisable at this point to call attention in some detail to the usual practice in servicing natural gas as transmitted through transcontinental pipe lines as indicated for instance at 12 in Fig. 1 of the drawings. The gas pressure is carried in these pipe lines at approximately 700 lbs. per square inch, which pressure is maintained throughout its length by booster stations located along the route. When a tap line is taken off said pipe lines 12, such for instance as leading to a city, the gas undergoes a pressure reduction as heretofore set forth, and this pressure reduction is usually accomplished in two stages, first at a station such for instance as indicated at 13, where the gas is reduced to approximately 400 lbs. per square inch, and then at a similar station where the gas is reduced to approximately 250 lbs. per square inch. From this second stage of gas pressure reduction, the gas is conveyed to what are commonly known as a town border station as indicated for instance at 14 in Fig. 1. From the town border station 14 the gas is then conveyed through branch pipe lines 15 (or laterals as they are sometimes called), to underground feeder stations located in several different parts of the city to thus get an even distribution of gas throughout the city mains. These underground feeder stations are indicated generally at 16 (three of these stations being shown in the drawings but there may be many more), and of course each one of these stations also is equipped with the dual arrangement of primary and emergency regulators as well as the safety device of the present invention as herein disclosed.

Referring particularly to Fig. 2, it will be noted that the housing 5 is provided with removable partitions 17 and 18 dividing said housing into three main chambers, namely a gas inlet chamber 19 in communication with the primary reducing regulator 1 through the pipe connection 8; a gas inlet chamber 20 in communication with the secondary or emergency reducing regulator 2 through the pipe connection 9, and a gas outlet chamber 21 intermediate said inlet chambers 19 and 20 and in communication with both of said inlet chambers through a passage 22 formed in each of the partitions 17 and 18, the flow of gas through passage 22 from inlet chamber 19 to the outlet chamber 21 and then through the outlet connection 10 through the system being controlled by primary cut-off valve 3, and likewise the flow of gas through passage 22 from inlet chamber 20 to said outlet chamber 21 and through the system being controlled by the secondary cut-off valve 4, a suitable valve seat being provided upon each partition for proper seating of either cut-off valve when in its closed position for preventing flow of gas from its inlet chamber to the outlet chamber in question.

As will be obvious these removable partitions 17 and 18 not only serve for the purpose of dividing the housing 5 into the three main chambers above referred to, but also constitute means including a valve seat whereby the cut-off valves may be properly seated thereagainst when said valves are in their closed positions. Furthermore, these removable partitions may have press fit against a neoprene gasket to retain them in place within the housing 5, or in fact may be removably secured in any manner most suitable in production.

It is well to note at this time that when a safety device incorporating primary and secondary cut-off valves as here provided, is installed in a system of the character described, both cut-off valves will be in their closed positions and with said safety device ready for proper setting and hook-up for the purpose of performing its several functions; the cut-off valve 3 being biased to closed position by spring 23, and cut-off valve 4 being biased to closed position by spring 24, it being further noted here that spring 23 is so designed as to have a more powerful closing action than that of spring 24, as for instance, in the present embodiment, the spiral spring 23 is of stronger gauge wire than that of the spiral spring shown at 24, and this for a purpose which will be apparent hereinafter. Incidentally spring 23 must be of sufficient strength not only to move cut-off valve to closed position but also to overcome the tension of spring 24 plus the force created by pressure originating from the secondary pressure reducing valve, and this to permit the moving of secondary cut-off valve 4 to full cocked and open position. As to spring 24, said spring need only be of sufficient strength to move cut-off valve 4 into the line of flow of pressure medium which in itself will also tend to move valve 4 to its closed sealing position.

Furthermore, both cut-off valves may be independently and manually moved to open position and also cocked in such position against the tension of its closing spring, by a setting and indicator arm and its associated valve setting or cocking cam, the arm element so mounted to be positioned exteriorly of the housing upon a transverse shaft extending within the outlet chamber of the housing through one side thereof and for the purposes intended. For instance, and when considering the primary cut-off valve 3 at the right side of Fig. 2, the setting and indicator arm is shown at 25 where it is pivotally mounted at one end upon a side of the housing 5 and located outside the housing for manual operation in performing its setting and indicating functions. This arm 25 is keyed or otherwise fixed to one end of a transverse cam shaft 26 entering the housing at said side thereof and mounted for oscillating movement upon and within the housing. Adjustably mounted upon the free end of said cam shaft within the housing is a setting or valve cocking cam 27, said cam 27 being operatively positioned in horizontal alignment with the valve stem 28 of cut-off valve 3, and adapted to contact the end of said valve stem for moving the cut-off valve 3 to its cocked open position.

A similar general arrangement of valve operating parts is also mounted upon and within the housing for association with the secondary cut-off valve 4, the setting and indicator arm being designated at 29; the transverse cam shaft at 30; the valve setting or cocking cam at 31; and with the valve stem of cut-off valve 4 indicated at 32.

When considering the details as to the mounting of the cam shafts 26 and 30, and their valve setting or cocking cams 27 and 31, reference should be made particularly to Fig. 5 of the drawings. It will be noted from this figure that the cam shaft (30 for instance) enters the housing 5 through the bore of a boss 64, which boss is preferably formed integral with the side wall of said housing and then projects within the housing to the desired extent to form a proper main bearing for said oscillating shaft 30. As indicated above, the indicator arm (29 for instance) is keyed or otherwise secured to one end of shaft 30 and positioned outside the housing for the purposes intended. The other end of said shaft 30 is preferably reduced in diameter as at 65, and it is upon this reduced diameter portion of the shaft, the setting or cocking cam (31 for instance) is adjustably mounted. Said cam 31 is shown (as in Fig. 5) properly positioned for performing its function, and in such position bears against a neoprene sealing washer 66 closely fitting said shaft 30 and interposed between a side face of the cam and the inner end of boss 64, where said sealing washer serves to prevent leakage of pressure fluid around the oscillating shaft, as will be obvious. The reduced diameter portion 65 of shaft 30 at its end is preferably screw threaded to receive a nut 67 which holds the cam (31 for instance) in its adjusted position and firmly against the sealing washer 66. Furthermore, a set screw or screw bolt 68 enters the housing 5 through an opposite side wall of said housing, and it is within the inner end of said screw bolt that the extreme free end of said reduced diameter shaft portion 65 is journalled, and this for the purpose of providing a proper and firm mounting for the oscillating cam shaft and its attached cam. It is also well to note at this point that the screw opening for receiving the screw bolt 68 is of such diameter as to permit access to the nut 67 for the proper adjustment of the setting or cocking cam. While these details as to mounting of the oscillating shaft and its cam present an operative embodiment of this phase of the invention, it will of course be understood that these parts may be mounted in any manner most suitable in production for accomplishing their intended purposes.

It should also be borne in mind at this time that the cut-off valves of this safety device are freely guided in their movements to both open and closed positions. For instance and when considering primary cut-off valve 3, a guide member 33 is detachably mounted within the outlet chamber 21 of the housing, the lower end of said guide member preferably having a horizontally extending circular bore for receiving the valve stem 28 and guiding it in its movements. This guide member 33 is held suspended from the top of the housing and within the same by screw-threaded engagement with the stem 34 of a diaphragm pressure device 35 to which reference will be made hereinafter. Furthermore, the guide member 33 is held in its valve stem guiding relation with the top wall of the housing by a key 35', which enables said guide member to be readily and properly installed in its valve stem receiving and guiding relation with the valve stem 28.

Further than the above, the primary cut-off valve 3 is maintained and assisted in its guided relation within the housing by guide means at the opposite side of said valve, and wherein said valve is provided with a supplemental valve stem 36 which is received preferably within a circular bore of a sleeve member 37 carried by the screw cap 7 for the housing. This guide means is of course in horizontal alignment with the previously described valve guide member 33, and further it is to be noted that the valve moving spring 23 is interposed between the end of the supplemental valve stem 36 and the screw cap 7.

As is apparent by reference to Fig. 2 of the drawings, the guiding relation of the various parts in so far as the secondary cut-off valve 4 is concerned, is, generally speaking, quite similar, the guide member for the valve stem 32 being designated at 38; the screw threaded stem of a diaphragm pressure device as associated with said cut-off valve 4, designated at 39; the diaphragm pressure device at 40; the key between the top wall of the housing and the guide member 38 being designated as 41; the supplemental valve stem at 42; and the sleeve member as carried by the screw cap 6 being designated as 43.

While it is true that the guide member 38 is similar in some respects to guide member 33 as associated with the primary cut-off valve 3, said guide member 38 is in addition provided with a supplemental guide member 44, preferably integral therewith and extending in a direction toward the primary cut-off valve stem 28, said member 44 not only having guiding relationship with the valve stem 32 of the secondary cut-off valve 4, but also serving as a means for supporting and guiding the free end of a valve cocking pin or rod generally indicated at 45 and pivotally carried at the end of primary cut-off valve stem 28, which valve cocking pin in its supported relation with the supplemental guide member 44 is free for a relatively slight transverse movement upon its pivot to allow the extreme free end of said cocking pin to lower by gravity and furthermore guided to the positions it must assume in the performance of its valve cocking and setting operations.

This valve cocking pin 45, as heretofore indicated, is pivotally attached to the free end of valve stem 28, its pivotal attaching means being clearly shown by reference to Fig. 4. In this figure it will be particularly noted that the cocking pin at its pivoted end is preferably reduced in diameter as at 46 and provided with a rounded head 47 which is seated within a recess 48 formed in the end of valve stem 28. Furthermore, a screw threaded washer 49 is provided for closing the recessed end of said valve stem 28 after the head 47 is inserted in said recess 48, and it is between this washer 49 and the head 47 that a spiral spring 50 is provided for maintaining the rounded head in its seated relation within the recess 48 and for slight play with respect to its seat to permit transverse movement of the cocking pin in performing the valve cocking and setting operations.

In order to allow for movement of the cocking pin upon its pivot in a transverse direction for the purposes intended, the screw-threaded washer 49 is provided with a circular opening 51 therein to allow for the proper clearance in this connection, and furthermore, and for easily assembling all of the pivotal connection parts of said valve cocking pin as herein set forth, the reduced end 46 of the cocking pin may be detachably secured in place upon the cocking pin assembly as by lock pin 52 or any other suitable connection.

As has been indicated above, both cut-off valves 3 and 4 are in their closed positions when the safety device is installed in the pressure system and properly connected with its associated dual arrangement of primary and secondary pressure reducing regulators, as for instance 1 and 2. With the cut-off valves 3 and 4 in these closed positions, the setting and indicator arms 25 and 29 are in their upstanding positions thus indicating to the station attendant that both valves are closed.

At this point the safety device is ready to be placed in working action within the system for the passage of pressure gases through said safety device and to the pipe line system which it serves. Therefore and with a view to placing only the primary reducing regulator 1 in action for passage of pressure gases through the safety device, the setting and indicator arm 25 is moved from its upslanting position to its down-slanting position as shown in Fig. 2. During this movement the valve setting cams 27 contact the end of the valve stem 28 and move cut-off valve 3 against the tension of spring 23 and to open position. In the down-slanting position of the setting and indicator arm 25 the cut-off valve 3 is in its full open position as shown in Fig. 2, in which position it is held cocked by diaphragm trip rod 53, the lower end of which engages within an annular groove 54 formed upon the guiding surface of the valve stem 28, and thus preventing closing of valve 3 until such time that it might be released by the lifting of the diaphragm trip rod 53. The major portion of the trip rod 53 is in the form of a loose piston mounted within a cylinder or bore formed within the stem 34 of the diaphragm pressure device 35, said bore being in communication with the pressure chamber of said device as located below the diaphragm therein; and furthermore the lower end of said trip rod is reduced in diameter as at 36 to have a sliding fit within an opening formed in the bottom wall of stem 34 and then enters through an opening in guide member 33 and into the annular groove 54 in valve stem 28 for valve cocking purposes, and this only in the event the pressure system is in normal working order and with the diaphragm pressure device spring 55 above the diaphragm so tensioned against the normal pressure in the system as to hold said trip rod in its lowered or cocking position. These details as just related in connection with valve cocking operation of cut-off valve 3, as will be understood, are also similar as to structure and operation when considering cut-off valve 4.

Therefore under normal working conditions of a pressure system of the character designated, first the primary reducing regulator is in action due to the opening of the cut-off valve 3; second, the cut-off valve 3 is held in its cocked open position due to proper tensioning action of spring 55 of the diaphragm pressure device (the several parts above described being positioned in their cocking positions as illustrated in Fig. 2); and third cut-off valve 4 at such time remains closed and necessarily the secondary or emergency pressure reducing regulator 2 is out of action in said pressure system. Such being the case, pressure gases from the primary reducing regulator pass through connection 8 into the inlet chamber 19 of the safety device, then through opening 22 into the outlet chamber 21, and then through connection 10 to the pipe line system, all of which is under normal and effective pressure working conditions. Furthermore, and in so far as the underground feeder stations are concerned, the flow of pressure gases is substantially the same, except that in such instance said pressure gases at each station pass into its pipe line 11 through a check valve C as referred to herein, and then into the city mains, said check valves being so installed as to prevent back pressure from said city mains resulting from any particular primary reducing regulator, as located in one of the underground feeder stations, failing to function properly and prematurely effecting or tripping all other normal operating stations which supply the city mains.

However, and in the event that something goes wrong with the primary reducing regulator and gas pressure builds up above normal and within the system, naturally this excess pressure likewise builds up within inlet chamber 19 and the outlet chamber 21 under the conditions just related, and with the several elements of the safety device in their positions as just described above. Therefore, provision is made for this excess pressure to immediately pass through port 56 extending through a wall of the valve stem guide member 33, thence through port 56' in the bottom wall of the stem 34 of the diaphragm pressure device, where said excess gas then enters the cylinder bore of said stem 34 around the diaphragm trip rod 53 to the diaphragm chamber; and then exerts its force upon the under surface of the diaphragm 57 and against the tension of spring 55, thus lifting the trip rod from its valve cocking position in engagement within the annular groove 54 of valve stem 28 and permitting cut-off valve 3 to be biased to closed position by spring 23. This closing of cut-off valve 3 is instrumental in cutting out of action, in the pressure system, the damaged primary reducing regulator, and thus prevents continued building up of pressure in the system to a danger point. The spring 55 may be adjusted to its proper tension for the purposes intended, and this by means of a screw nut as indicated at 55'.

Not only is the damaged primary reducing regulator cut out of action in this manner, but the movement of cut-off valve 3 to closed position also, through certain instrumentalities to be described hereinafter, serves to move the secondary cut-off valve 4 from its normally closed position to cocked open position, thus cutting in for action the emergency or secondary reducing regulator; and this at approximately the same time the damaged primary reducing regulator is cut out of action. With this operation of cutting in the emergency or secondary reducing regulator, the pressure system is immediately restored to proper working order upon failure of the primary reducing regulator to properly function in said pressure system. It will therefore be seen that ample time will be allowed for the detecting and repairing of the faulty primary reducing regulator, there being an extremely remote chance that the secondary reducing regulator, soon after being cut into service, will develop trouble and refuse to function at the particular station in question, thus causing the pressure to build up once again.

As to the automatic valve cocking operation of the secondary cut-off valve 4, it is to be noted that the supplemental guide member 44 is closed at its end except for a centrally located opening 57 properly dimensioned to allow, at the proper time, sliding relationship therethrough of an enlarged portion of the valve cocking pin 45, and this for a purpose which will hereafter appear. At this point, it is well to note that this enlarged portion of the valve cocking pin 45, is indicated at $a$ and extends from its pivotal connection with the valve stem 28 to a point where it tapers off as indicated at $b$. This taper is in the form of a conical face terminating at the reduced diameter portion $c$ of said cocking pin 45, which portion $c$ extends through the opening 57 at the end of said supplemental guide member 44, thus providing a support for the free end portion $c$ of the pivoted valve cocking pin 45 and the positioning of the same for carrying out its functions when the cut-off valve 3 is moved to closed position.

The several portions of the cocking pin 45 are so proportioned and arranged with respect to opening 57 that at the time cut-off valve 3 is in open position, the extreme end of the reduced portion $c$ of the cocking pin is directed toward a solid part of the end of secondary cut-off valve stem 32, which valve stem at that time projects to a position within the supplemental guide member 44 and to a point where its solid end part is adjacent the extreme free end of said cocking pin portion $c$. Therefore when primary cut-off valve is moving to closed position, valve cocking pin 45 will also move in the same direction, and during such movement, the extreme free end portion of the cocking pin 45 will be brought into contact with the solid part of the valve stem 32 and remain in such engagement for moving said valve stem 32 within its guide members 38 and 44 until such time when the secondary cut-off valve 4 is also moved to full cocked position as heretofore described. Furthermore, valve stem 32 is provided with a central bore 58, and at this point it is well to note that when the secondary cut-off valve 4 has been fully cocked to open position by the action of the several parts just described, then at that time the conical face $b$ of the cocking pin 45 comes into play for lifting the extreme end portion of said cocking pin out of engagement with the solid end part of the valve stem 32, where said end portion of the cocking pin is centered and enters within the central bore 58. This lifting and centering action of the cocking pin 45 is brought about by engagement of the conical face $b$ with an edge of the opening 57 against which it rides during movement of the cocking pin for lifting said cocking pin, and thus permit entry of the enlarged portion $a$ of the cocking pin within said opening 57 for properly centering the free end of the cocking pin within the central bore of the valve stem 32, which relationship is necessary to allow proper closing of secondary cut-off valve 4 in the event something goes wrong with the secondary or emergency pressure reducing regulator 2, and this without affecting the other movable parts of the safety device.

It will of course be understood that the parts not so far specifically referred to in connection with the secondary cut-off valve 4 and its associated diaphragm pressure device 40, are in all respects similar in structure and operation to those described with reference to the primary cut-off valve 3 and its associated diaphragm pressure device 35. For instance when referring particularly to Fig. 2, the diaphragm trip rod is designated 59; the annular groove formed in the guiding surface of valve stem 32 is as designated at 60; the diaphragm pressure device spring designated at 63; the screw nut for adjusting the tension of said spring designated as 63'; the relief port extending through a wall of the valve stem guide member 38 being designated as 61; the relief port in bottom wall of the stem 39 of the diaphragm pressure device as at 61'; and the diaphragm for the pressure device 40 as shown at 62. As will of course be obvious these several parts will function in the same manner as that described in connection with primary cut-off valve 3, so that in the event anything should go wrong with the secondary or emergency pressure reducing regulator 2 after it is cut in the system for proper action, then the secondary cut-off valve will be closed to cut-out such defective regulator from the system.

Referring particularly to valve cocking cam 27, it is to be noted that said cam is bifurcated to straddle the larger portion *a* of the valve cocking pin 45, the oscillating cam shaft 26 being located beneath said cocking pin and the camming surfaces of said bifurcated cam adapted to engage the end of valve stem 28 at opposite sides of said valve cocking pin.

As to valve cocking cam 31 as used for manually cocking secondary cut-off valve to open position, the general operation is substantially the same as cam 27 except as to its relationship to certain parts adjacent thereto. Said cam 31 is of the bifurcated type which is adapted to straddle the supplemental guide member 44, said member being cut away on opposite sides thereof for such purpose.

Reference has been made herein to the several underground feeder stations 16 which are located as required throughout a city for serving the city mains. These city mains are generally indicated at B in Fig. 1 of the drawings, and it must be borne in mind at this point that it is an object of this invention to maintain to an efficient extent, the required and predetermined pressure throughout the city mains. With such object in view, it is of the utmost importance and necessary to prevent any bulid up of pressure which might originate in any one of the underground feeder stations 16 from affecting any of the other underground feeder stations, and therefore, and in order to accomplish this end, a check valve C is installed in the pipe lines 11 between each safety device A and the city mains B; these check valves being so arranged as to permit build-up of pressure from any one of the regulator set-ups (in case of failure of a pressure reducing regulator) to the city mains but not from the city mains to such regulators. Such being the case, the check valve C will serve to check the flow of pressure gases from the city mains back to any of the regulator set-ups (including the safety device of this invention), thereby effectively solving the problem of back pressure and preventing the premature tripping of any of the cut-off valves at the several operative underground feeder stations and this when a rise in pressure originates at any particular underground feeder station as has been clearly set forth herein.

While reference has been made herein to relatively high pressure systems, it is to be definitely understood that this improved automatic safety device is applicable to all pressure ranges, whether in inches or pounds, and so that all systems regardless of pressure range may be properly controlled according to the inventive concept of this invention.

What I claim is:

1. In a safety device for a pressure reducing system, a housing for said device, means for delivering fluid medium under substantially similar pressure from either of two sources to within said housing and through a common outlet from the housing to a low pressure pipe line system, a primary cut-off valve within the housing controlling the flow of one source of fluid pressure through the system, a secondary cut-off valve within said housing controlling the flow of the other source of fluid pressure through said system, said secondary cut-off valve under normal working conditions being maintained closed when the primary cut-off valve is maintained in its open position permitting the flow of said one source of fluid pressure only, automatic mechanism within the housing for closing the primary cut-off valve upon undue rise of pressure in the low pressure pipe lines system to thus cut off fluid pressure from said one source of fluid medium and at the same time open up the secondary cut-off valve to permit flow of the other source of fluid pressure to thus continue without interruption the flow of normal pressure medium in the low pressure pipe line system, and automatic pressure operated means brought into play by further undue rise of pressure in the low pressure pipe line system for closing said secondary cut-off valve while still maintaining said primary cut-off valve in its said closed position.

2. In a pressure reducing system of the character indicated, a primary pressure reducing regulator, an emergency or secondary pressure reducing regulator, a safety device for said system, said safety device including a normally open primary cut-off valve associated with said primary regulator and a normally closed secondary cut-off valve associated with said emergency regulator, means whereby due to undue rise of pressure in the system through the primary reducing regulator the primary cut-off valve is moved to closed position to cut out the primary regulator to relieve such undue pressure and at the same time to thereby automatically move said secondary cut-off valve to open position to cut in the emergency regulator and immediately restore the system to flow of normal pressure, and means for permitting closing of said secondary cut-off valve while maintaining the primary cut-off valve in its said closed position should undue rise of pressure continue in the system upon failure of the emergency pressure reducing regulator to function properly in the system.

3. In a pressure reducing system of the character indicated, a primary pressure reducing regulator, an emergency or secondary pressure reducing regulator, a safety device for said system, said safety device including a normally open primary cut-off valve for controlling flow of fluid pressure from said primary pressure reducing regulator and a normally closed secondary cut-off valve for controlling flow of fluid pressure from the secondary pressure reducing regulator, a valve stem for said primary cut-off valve, a guide member for said valve stem, a pressure controlled trip rod cooperating with said valve stem to maintain the primary cut-off valve in its cocked open position during flow of normal pressure through the primary regulator and the pressure system, a valve stem for said normally closed secondary cut-off valve, a guide member for said last mentioned valve stem, a pressure controlled trip rod adapted to cooperate with said last mentioned valve stem to hold the same in valve cocking position when said secondary cut-off valve is moved to open position, and a valve cocking pin intermediate the ends of said valve stems, said cocking pin being pivotally mounted at one end to the primary cut-off valve stem and then extending in a direction toward the secondary cut-off valve stem where the free end of said cocking pin is adapted to be positioned for direct contact with the end of said last mentioned valve stem to thereby move said valve stem and place said secondary cut-off valve in cocked open position during movement of the primary cut-off valve to closed position and this after its stem has been released from cocking engagement with its trip rod due to rise of pressure above normal from the primary reducing regulator.

4. The invention according to claim 3, in which each pressure controlled trip rod is connected at one end to a pressure operated diaphragm arranged in the pressure system and with the other end of said trip rod adapted to be moved by said diaphragm to a position within an annular groove formed upon the outer face of the valve stem and for holding the valve in cocked position.

5. The invention according to claim 3, in which the pressure controlled trip rod for each of said valves is arranged at right angles to the valve stem of each valve and with the free end of said trip rod adapted to engage within an annular groove formed upon the outer face of said valve stem.

6. The invention according to claim 3 in which a portion of each pressure controlled trip rod intermediate its ends is enlarged in diameter and loosely guided within a cylindrical bore which is in direct communication with a pressure operated diaphragm for conveying pressure medium thereto for the purposes intended.

7. In a pressure reducing system of the character indicated, a primary pressure reducing regulator, an emergency or secondary pressure reducing regulator, a safety device for said system, said safety device including a normally open primary cut-off valve for controlling flow of fluid pressure from said primary pressure reducing regulator and a normally closed secondary cut-off valve for controlling flow of fluid pressure from the secondary pressure reducing regulator, a valve stem for said primary cut-off valve, a guide member for said valve stem, a pressure controlled trip rod cooperating with said valve stem to maintain the primary cut-off valve in its cocked open position during flow of normal pressure through the primary regulator and the pressure system, a valve stem for said normally closed secondary cut-off valve, a guide member for said last mentioned valve stem, a pressure controlled trip rod adapted to cooperate with said last mentioned valve stem to hold the same in valve cocking position when said secondary cut-off valve is moved to open position, a valve cocking pin intermediate the ends of said valve stems, said cocking pin being pivotally mounted at one end to the primary cut-off valve stem and then extending in a direction toward the secondary cut-off valve stem where the free end of said cocking pin is adapted to be positioned for direct contact with the end of said last mentioned valve stem to thereby move said valve stem and place said secondary cut-off valve in cocked open position during movement of the primary cut-off valve to closed position and this after its stem has been released from cocking engagement with its trip rod due to rise of pressure above normal from the primary reducing regulator, and means for lifting and centering the cocking pin upon its pivot and with its free end in alignment with a longitudinal bore formed in the secondary valve stem, whereby when the secondary valve has been moved to full cocked position the cocking pin then assumes a position relative to the secondary valve stem to permit entry of the free end of the cocking pin within said longitudinal bore to facilitate proper closing of the secondary cut-off valve due to rise of pressure in the system after the emergency pressure reducing regulator has been cut in for action.

8. The invention according to claim 7, in which the means for lifting and centering the cocking pin includes a cone-shaped camming element carried by the cocking pin and adapted for sliding engagement within a centrally located opening in the secondary valve stem guide member.

9. The invention according to claim 7, in which the pivoted cocking pin has a reduced free end portion for contacting the end of the secondary valve stem and also an enlarged portion tapering off and merging with the surface of the reduced portion, said tapering portion adapted for camming action within a centrally located opening in the secondary valve stem guide member for lifting and centering the free end portion of said cocking pin, and the enlarged portion of the cocking pin having close fit with said opening for maintaining the cocking pin in its centered position after the secondary cut-off valve has been fully cocked.

10. In a pressure reducing system of the character indicated, a primary pressure reducing regulator, an emergency or secondary pressure reducing regulator, a safety device for said system, said safety device including a normally open primary cut-off valve associated with said primary regulator and a normally closed secondary cut-off valve associated with said emergency regulator, means whereby due to undue rise of pressure in the system through the primary reducing regulator, the primary cut-off valve is moved to closed position to cut-out the primary regulator to relieve such undue pressure and at the same time to thereby automatically move said secondary cut-off valve to open position to cut in the emergency regulator and immediately restore the system to flow of normal pressure, and means for permitting closing of the secondary cut-off valve upon failure of the emergency regulator to properly function in the system and this while still maintaining the primary cut-off valve in its said closed position.

11. The invention according to claim 10, in which the means for closing the primary and secondary cut-off valves is in the form of a pressure operated diaphragm in the pressure system serving to detect rise of pressure in said system and thereafter serving to close the valve upon failure of its associated pressure reducing regulator.

12. In a safety device for a pressure reducing system incorporating primary and emergency pressure regulators and with only one of said regulators functioning when the system is in normal operation, said safety device including a housing in communication with both said pressure regulators, a primary cut-off valve within said housing and controlling the flow of fluid pressure entering said housing from said primary regulator and to the housing outlet, a secondary cut-off valve within said housing and controlling the flow of fluid pressure entering said housing from said emergency regulator and to said housing outlet, individual cam means mounted within the housing for moving each of said cut-off valves to open position, manual means positioned outside of said housing for operating each of said cam means, said manual operating means also serving for indicating either the open or closed position of each of said cut-off valves, means for maintaining the primary cut-off valve cocked when moved to open position to thus provide for flow of fluid pressure from said primary regulator to said housing outlet and through the system under normal conditions, means for maintaining said secondary valve closed under normal conditions and when the primary valve is in open position to thereby prevent flow of pressure fluid from said emergency regulator to said housing outlet and through the system, and means brought into action due to undue rise of pressure through said primary regulator for closing said primary cut-off valve and at the same time moving the secondary cut-off valve to cocked open position to place said emergency regulator in action for its useful purpose.

13. The invention according to claim 12, in which the cam means for each of the cut-off valves is adjustably mounted upon a stub shaft journalled for oscillating movement upon the housing and wherein the manual operating means for said cam means is in the form of an indicator arm fixed to the other end of the stub shaft and located outside the housing.

14. The invention according to claim 12, in which the cam means for each of the cut-off valves is in the form of a bifurcated member for moving the valves to open position.

15. In a pressure reducing system of the character indicated, a primary pressure reducing regulator, an emergency or secondary pressure reducing regulator, a safety device for said system said safety device including a normally open primary cut-off valve for controlling flow of fluid pressure from said primary pressure reducing regulator and a normally closed secondary cut-off valve for controlling flow of fluid pressure from the secondary pressure reducing regulator, a valve stem for said primary cut-off valve, means for maintaining the primary cut-off valve in cocked open position during flow of normal pressure through the primary regulator and the pressure system, a valve stem for said normally closed secondary cut-off valve, a valve cocking pin intermediate the ends of said valve stems, said cocking pin being pivotally mounted at one end on the primary cut-off valve stem and then extending in a direction toward the secondary cut-off valve stem where the free end of said cocking pin is adapted to be positioned for direct contact with the end of said last mentioned valve stem to thereby move said valve stem and place said secondary cut-off valve in cocked open position during movement of the primary cut-off valve to closed position and this after its stem has been released from said cocked open position and due to rise of pressure above normal from the primary reducing regulator, and individual manually operated cam means adapted to contact an end of each of said valve stems for moving the valves to open position as required.

16. The invention according to claim 15, in which the cam means is in the form of a bifurcated member adapted to straddle the valve cocking pin and having camming action against the end of each valve stem for purposes intended.

17. In a pressure reducing system of the character indicated and including a primary pressure regulator normally active in said system and a secondary or emergency pressure regulator ready for action upon failure of the normally active primary regulator and with both of said regulators adapted for feeding fluid pressure to a low pressure pipe line system, a safety device associated with said pressure reducing system and adapted to control the operation of both of said pressure regulators for maintaining uninterrupted flow of predetermined pressure medium to the low pressure pipe line system from either one or the other of said pressure regulators and with only one of the pressure regulators functioning during operation of the low pressure system, the safety device comprising in combination a primary cut-off valve adapted to control flow of fluid pressure from the primary pressure reducing regulator in the system, a secondary cut-off valve adapted to control the flow of fluid pressure from the secondary or emergency pressure reducing regulator, said primary cut-off valve during initial operation of the system being in its normal open position for permitting fluid pressure flow from the primary pressure regulator to the low pressure pipe line system and at the same time with the secondary cut-off valve in its normal closed position to prevent fluid pressure flow from said secondary pressure regulator to said low pressure pipe line system and during functioning of the primary regulator, automatic pressure operated means brought into play by undue rise of pressure in the low pressure pipe line system for releasing said primary cut-off valve from its normally open position to permit said valve to move to closed position shutting off flow of fluid pressure from said primary pressure regulator and at substantially the same instant moving the normally closed secondary or emergency cut-off valve to open position, and automatic pressure operated means brought into play by further undue rise of pressure in the low pressured pipe line system for closing said secondary cut-off valve while still maintaining said primary cut-off valve in its said closed position, whereby the low pressure pipe line system is protected from undue rise in pressure caused by failure of either of the pressure regulators.

18. In a safety device for a pressure reducing system, a housing for said device, means for delivering fluid pressure from either of two sources to within said housing and then through a common outlet from the housing to a low pressure pipe line system, a primary cut-off valve within the housing controlling the flow of one source of fluid pressure through the system, a secondary cut-off valve within said housing controlling the flow of the other source of fluid pressure through said system, said secondary cut-off valve under normal working conditions being maintained closed when the primary cut-off valve is in open position permitting the flow of said one source of fluid pressure only, means controlled by undue rise of pressure in the low pressure system for closing the primary cut-off valve, said primary cut-off valve upon closing serving to simultaneously move said secondary cut-off valve to open position permitting the flow of the other source of fluid pressure only through the system to thereby maintain an uninterrupted flow of the predetermined pressure fluid medium in said low pressure pipe line system, and means controlled by undue rise of pressure in the low pressure pipe line system as fed by said other source of fluid pressure for closing the secondary cut-off valve while still maintaining the primary cut-off valve in its said closed position.

19. In a safety device for a pressure reducing system, a housing for said device, means for delivering fluid medium under substantially similar pressure from either of two sources to within said housing and through a common outlet from the housing to a low pressure pipe line system, a primary cut-off valve within the housing controlling the flow of one source of fluid pressure through the system, a secondary cut-off valve within said housing controlling the flow of the other source of fluid pressure through said system, said secondary cut-off valve under normal working conditions being maintained closed while the primary cut-off valve is maintained in its open position permitting the flow of said one source of fluid pressure only, pressure operated means to automatically close the primary cut-off valve upon undue rise of pressure in the low pressure pipe line system for cutting off fluid pressure from said one source of pressure and at substantially the same instant open the normally closed secondary cut-off valve to permit flow of the other source of fluid pressure to thus continue without interruption the flow of normal pressure medium in the low pressure pipe line system, and automatic pressure operated means brought into play by further undue rise of pressure in the low pressure pipe line system for permitting closing of the said secondary cut-off valve while still maintaining said primary cut-off valve in its said closed position.

20. The invention according to claim 19, in which the pressure operating means for closing the primary cut-off valve is in the form of a diaphragm controlling the release of said valve for its closing movement.

21. In a safety device for a pressure reducing system, a housing for said device, means for delivering fluid medium under substantially similar pressure from either of two sources to within said housing and through a common outlet from the housing to a low pressure pipe line system, a primary cut-off valve within the housing controlling the flow of one source of fluid pressure through the system, means for setting and holding said primary cut-off valve in normal open position during initial and proper operation of the pressure system, spring means for moving said primary cut-off valve to closed position upon release of said holding means due to undue rise of pressure in the low pressure pipe line system, a secondary or emergency cut-off valve within said housing controlling the flow of the other source of fluid pressure through said pressure system, said secondary cut-off valve under normal working conditions of said pressure system being maintained closed while the primary cut-off valve is maintained in its open position permitting the flow of said one source of fluid pressure only, spring means for moving and retaining the secondary cut-off valve in its closed position, pressure operated means for releasing the primary cut-off valve holding means for permitting said first mentioned spring means to move said primary cut-off valve to closed position upon undue rise of pressure in the low pressure pipe line system, said closing movement of the primary cut-off valve serving at the same instant to move the normally closed secondary cut-off valve to open position to permit flow of the other source of fluid pressure only and to thus continue without interruption the flow of normal pressure medium in the low pressure pipe line system, automatically operated means for holding and maintaining said secondary cut-off valve in its then open position and under proper pressure conditions, and pressure means operated upon further undue rise of pressure in the low pressure pipe line system for releasing the secondary cut-off valve holding means and thus permit said secondary cut-off valve spring means to function and move said last mentioned valve to closed position while still maintaining the primary cut-off valve in its said closed position, whereby dual protection for the pressure system is adequately provided.

22. The invention according to claim 21, in which the primary cut-off valve closing spring means is of sufficient strength to serve as the sole power for moving the secondary cut-off valve to open position against the normal spring tension action of the secondary cut-off valve spring closing means.

References Cited in the file of this patent

UNITED STATES PATENTS

| Number | Name | Date |
|---|---|---|
| 797,664 | Cottingham | Aug. 22, 1905 |
| 890,862 | Johnson | June 16, 1908 |
| 2,318,261 | St. Clair | May 4, 1943 |
| 2,354,286 | Whaley | July 25, 1944 |
| 2,370,110 | Spence | Feb. 20, 1945 |
| 2,578,042 | Chandler | Dec. 11, 1951 |